Patented Dec. 12, 1922.

1,438,599

UNITED STATES PATENT OFFICE.

JOSEPH A. JEFFERY, OF DETROIT, MICHIGAN, ASSIGNOR TO THE JEFFERY-DEWITT COMPANY, OF DETROIT, MICHIGAN, A CORPORATION OF MAINE.

REFRACTORY WARE.

No Drawing. Application filed January 3, 1921. Serial No. 434,763.

*To all whom it may concern:*

Be it known that I, JOSEPH A. JEFFERY, a citizen of the United States, and a resident of Detroit, county of Wayne, and State of Michigan, have made an invention appertaining to Refractory Ware; and I do hereby declare the following to be a full, clear, and exact description of the invention, such as will enable others skilled in the art to which it appertains to make and use the same.

My invention has for its object to provide a refractory ware which, when subjected to high temperatures, will not be readily deformed. It particularly has for its object to provide a refractory body that may be used in kilns and furnaces for supporting or containing ceramic materials that are to be subjected to a high temperature and thus in the use of the refractory ware containing my invention, the ware is subjected to repeated high temperature changes. My invention thus provides a composition of bodies that may be used for a great variety of purposes, such as for furnace linings, muffles, saggers, cranks, or kiln furniture generally and which, notwithstanding the repeated thermal changes will not deform or develop internal strains or stresses.

Heretofore it has been common in the art to form refractory bodies, such as brick for kilns and furnaces or the like, of finely divided carborundum, or similar material, and a small amount of clay and organic material that act as permanent and temporary binders. In refractory bodies formed of silicon carbide and a small amount of refractory bond clay the silicon will boil out when the bodies are subjected to high temperature and destroy not only the refractory bodies but also ceramic ware that may be located in the kiln and subjected to the same high temperature.

My invention provides a ceramic material formed of one or more of the highly refractory silicates, such as silicon carbide, sillimanite and diaspore in a finely divided condition, the particles of which are bonded together by a calcined clay or clay mixture that maintains a uniform density over a wide temperature range whereby the refractory ware containing my invention may be used repeatedly in kilns for burning ceramic ware within the range of temperature without deforming or developing internal strains and stresses. Where the materials that are bonded together ordinarily decompose and give off deleterious products such as in the case of silicon carbide, the calcined clay or clay mixtures, having substantially a uniform density over a wide range of temperatures will materially prevent the escape of such products and consequently prevent the injurious effects that would otherwise be produced in the ceramic articles burnt in the kiln, containing also the refractory ware formed of silicon carbide since the density will not be modified over the temperature range.

Furthermore, I avoid the use of any materials that will fuse below the said working temperature range as they will produce injurious effects on the ceramic ware burnt in the kiln and moreover will destroy the protective qualities of the calcined clay or clay mixture of the refractory ware.

In my invention I form a raw batch containing one or more highly refractory granular materials and a clay that will maintain a substantially uniform degree of vitrification over a wide range of temperature, or will maintain a substantially uniform degree of density over a wide range of temperature. By highly refractory granular material I mean a material that is known in ceramics as a super-refractory material as distinct from the lesser refractory material. The highly refractory granular materials comprise materials like silicon carbide, sillimanite and diaspore. The raw batch may be formed of 75% to 98% of the highly refractory granular material and the balance of clay or clay mixture that will maintain a substantially uniform density over a wide range of temperature, when calcined in firing the body. Preferably clays are selected that will produce a uniform density over a wide range of temperatures which is near the maximum density producible in the clay mixture.

I preferably use sufficient amount of clay or clay mixture so that a large part or substantially all of the particles of the highly refractory materials are covered when the article is molded or formed, the amount depending on temperature range that the refractory ware is to cover, and depending also on which of the highly refractory materials are used. If however an organic binder is used to maintain the form of the refractory body while in the green state the percentages of the total content of the other compositions will be varied accordingly. The organic binder however forms no part of the finished product and is merely used as a temporary binder until a certain temperature has been reached in the firing of the body.
In forming the raw batch, the grain size of the refractory materials used are properly proportioned and also the amount of clay to the amount of the refractory materials is likewise properly proportioned for if not enough fines of the refractory materials are used in proportion to the proper amount of clay, the working conditions of the refractory material during its formation is such that the bond is not sufficiently strong to facilitate the manufacture of the ware and give it sufficient strength to hold together until burnt, and if the clay is too great in quantity compared to the amount of fines and coarser particles of the refractory material, the refractory ware produced will be subjected to a similar deformation and the development of internal strains and stresses that refractory bodies are subject to when made largely of clay.
The selection of the clay should depend upon the maturing temperature of the combination of the composition of the batch and on the given range temperatures at which the refractory body is to be used. Furthermore, the clay or clay mixture should be selected so that they will operate to maintain a substantially uniform density throughout a wide temperature range, and according to whether they are to maintain a substantially uniform density over a low temperature range or over a high temperature range, such as for instance, ball or stone ware clays will maintain a substantially uniform density from cone 7 to cone 11, or Edgars' plastic kaolin and other Florida kaolins which maintain substantially a uniform density near maximum at temperatures ranging from that of cone 15 to 27. I have selected Edgars' plastic kaolin as the type of kaolin that I preferably use. I also may use Florida kaolins and kaolins or clays having the characteristics of Florida kaolins. A description of Edgars' plastic kaolin is given in the U. S. Geological Survey Paper No. 11 and pages 83-85, 1903, and the clays of Florida are described by E. H. Sellards, entitled, The Clays of Florida. Also the latter clays are described in the State Geological Survey of Florida 6th Annual Report, 1914, and in Notes on the Clays of Florida by George C. Matson U. S. Geological Survey Bulletin 380, 1909. It is, however, desirable to select clay or clay mixtures that fuse at a temperature well above the range in which the uniform density is maintained by the binder to remove possible changes of vitrification.

When the refractory ware contains a clay or clay mixture that has a uniform density over a given range of temperatures and is used within the range of temperature for which it is prepared, there will be no deformation notwithstanding the changes of temperatures to which the refractory ware is subjected. This is of particular value when it is considered that the exterior of the refractory ware changes temperature either in the heating or the cooling of the furnace before the interior of the refractory ware is similarly affected and moreover, the maximum effect of such changes that is the maximum rate of change is produced at the higher temperatures to which the refractory ware is subjected in use and if there is a difference in density between the material near the exterior of the ware and that of the interior strains or stresses are produced and the effect thereof is increased in the use of the refractory ware.
The refractory body when formed, may be heated in a kiln to a temperature preferably above that of the temperature range to which the refractory body is to be subjected when in use in order that there may be sufficient vitrification of the clay content of the refractory. When the temperature of the refractory ware is raised to a point that the maximum density is produced in the binder, the binder is completely vitrified and therefore the state of vitrification producible in the binder is maintained throughout the range of temperature for which the clay binder is selected, which operates to prevent any evaporation or decomposition of any deleterious materials in the binder itself or in the refractory silicates of the refractory ware and thus ceramic bodies burned in the kiln in which the refractory ware is located, are protected from injurious material that may be produced by decompositions of portions of the refractory ware.

In order that the particles may be held together until the body has been sufficiently heated to cause it to retain its form I preferably use an organic binder, particularly when the clay is small in amount or of a "short" nature. The organic binder may be formed of any suitable organic material such as gluten, flour or the like, which will burn out in the early part of the firing. The amount of the organic binder used in the formation of the articles from the raw batch preparatory to the firing may vary from a very small amount to 8% of the material of the raw batch.

In the formation of the refractory body the raw batch is placed in molds and is tamped, and is subjected to considerable pressure in the tamping operation in order to bring the particles of the refractory material in binding relation and to cause the uniform dissemination of the clay practically throughout the refractory body.

The composition of the raw batch may also be modified according to the method of the formation of the refractory bodies preparatory to firing. If the bodies are to be cast instead of molded a greater quantity of plastic clay and the necessary deflocculating salts if desired are added to the material in order to produce a suitable casting slip.

I claim:

1. The raw batch of a refractory ware comprising highly refractory granular material and a clay having the characteristics of Edgars' plastic kaolin.

2. The raw batch of a refractory ware comprising 75% to 98% of highly refractory granular material and the balance formed of a clay having the characteristics of Edgars' plastic kaolin.

3. A refractory body containing highly refractory granular material bonded by a calcined clay having the characteristics of Edgars' plastic kaolin.

In testimony whereof, I have hereunto signed my name to this specification.

JOSEPH A. JEFFERY.